US011882178B2

(12) United States Patent
Weber et al.

(10) Patent No.: US 11,882,178 B2
(45) Date of Patent: Jan. 23, 2024

(54) TIME SYNCHRONIZATION IN A REAL-TIME NETWORK

(71) Applicant: B&R INDUSTRIAL AUTOMATION GMBH, Eggelsberg (AT)

(72) Inventors: Horst Weber, Eggelsberg (AT); Franz Meisl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 57 days.

(21) Appl. No.: 17/520,035

(22) Filed: Nov. 5, 2021

(65) Prior Publication Data

US 2022/0150305 A1 May 12, 2022

(30) Foreign Application Priority Data

Nov. 6, 2020 (AT) .............................. A 50956/2020

(51) Int. Cl.
*H04L 67/1095* (2022.01)

(52) U.S. Cl.
CPC ................ *H04L 67/1095* (2013.01)

(58) Field of Classification Search
None
See application file for complete search history.

(56) References Cited

U.S. PATENT DOCUMENTS

| | | | |
|---|---|---|---|
| 7,447,931 B1 | 11/2008 | Rischar et al. | |
| 7,920,587 B2 | 4/2011 | Fuehrer | |
| 8,892,934 B2 | 11/2014 | Götz et al. | |
| 10,561,320 B2 * | 2/2020 | Edwards | G16H 40/67 |
| 2010/0020909 A1 * | 1/2010 | Jung | H04J 3/0667 |
| | | | 375/371 |
| 2016/0112974 A1 * | 4/2016 | Shenoi | H04J 3/065 |
| | | | 370/350 |
| 2016/0359979 A1 * | 12/2016 | Ito | H04L 12/403 |
| 2017/0214479 A1 | 7/2017 | Heine | |
| 2019/0104121 A1 * | 4/2019 | Khandani | H04L 9/0891 |

FOREIGN PATENT DOCUMENTS

| | | |
|---|---|---|
| EP | 2 544 389 A1 | 1/2013 |
| EP | 3 016 306 A1 | 5/2016 |
| GB | 2 426 164 A | 11/2006 |
| WO | 2005/119951 A1 | 12/2005 |
| WO | 2016/015769 A1 | 2/2016 |
| WO | WO-2020090664 A1 * | 5/2020 |

OTHER PUBLICATIONS

Wang et al., "HAaaS: Towards Highly Available Distributed Systems", Sep. 1, 2012, IEEE, 2012 IEEE International Conference on Cluster Computing (pp. 618-621) (Year: 2012).*
Austrian Search Report issued in Austrian Patent Application No. A 50956/2020, dated Jul. 9, 2021.

\* cited by examiner

*Primary Examiner* — Davoud A Zand
(74) *Attorney, Agent, or Firm* — GREENBLUM & BERNSTEIN, P.L.C.

(57) ABSTRACT

In order to synchronize the respective local network time of participants of a real-time network, wherein the participants are connected to one another via ports, the participants transmit, preferably cyclically, synchronization packets to connected participants, wherein one participant of the real-time network is designated as the synchronization master, and using the synchronization packets, the local network time of the other participants is synchronized with the local network time of the synchronization master.

18 Claims, 4 Drawing Sheets

TIME SYNCHRONIZATION IN A REAL-TIME NETWORK

CROSS-REFERENCE TO RELATED APPLICATION

This application claims priority under 35 U.S.C. § 119(a) to Austria Application No. A50956/2020 filed Nov. 6, 2020, the disclosure of which is expressly incorporated by reference herein in its entirety.

BACKGROUND

1. Field of the Invention

The present invention relates to a method for synchronizing a local network time of each participant in a real-time network, wherein the participants are connected to one another via ports, wherein the participants each transmit, preferably cyclically, synchronization packets to connected participants, wherein a participant of the real-time network is designated as the synchronization master, wherein using the synchronization packets the local network time of the other participants is synchronized with the local network time of the synchronization master (SM

2. Discussion of Background Information

Central processing units, bus modules, drive modules, bus couplers, IO modules with integrated network connection, cameras, HMI devices, network-integrated sensors and actuators, network infrastructure (switches, bridges, etc.) may be provided as participants of a real-time network. The participants each have a local time which is determined for each participant by a counter, wherein the counters, however, are not synchronous with one another due to oscillator tolerances. However, in order to enable participants of a real-time network to interact with physical processes in control systems, for example, the participants require a common time domain. This may ensure a more precise and faster control of processes in the real-time network. Movements of machine parts or goods, for example on a machine, may take place as physical processes. The physical processes are initiated by participants designed as actuators and recorded by participants designed as sensors.

A local network time, which is derived from the local time, may thus be provided for each participant. Due to oscillator tolerances of the respective counters, however, these local network times of the participants must in turn be precisely synchronized with one another down to a few hundred milliseconds to nanoseconds. For this purpose, complex synchronization methods are known, which are based on extensive software stacks, as provided, for example, in the PTP protocol. However, such methods require a correspondingly high processor performance on the part of the participants. On the other hand, simpler synchronization methods are also known, in particular in the case of real-time networks, which are divided into masters and slaves. The division of roles into master and slaves relates to a large part or to all of the communication in the real-time network and is fixed and is therefore unchangeable or changeable only via detours. The previously established communication master is also assigned a role as synchronization master. This synchronization master sends a synchronization signal to all participants in order to synchronize the local times of the participants with the global time. In so doing, the master uses a defined part of the existing network protocol, for example, a recognized start of a frame, in order to determine the global time. Well-known, simple synchronization methods are used in the Powerlink, X2X, Sercos and EtherCat network protocols. These simple synchronization methods place fewer demands on the processor performance, but also have a lower scope of functionality and are of course less precise than complex synchronization methods. For example, no signal propagation time compensation is possible with known simple synchronization methods.

Known synchronization methods are based on software, with which they are able to become active only after the network has been started. Real-time operation is therefore only possible after synchronization has taken place, which means that the time until the first synchronization is limited by the boot time of the software.

GB 2426164 A, U.S. Pat. No. 7,447,931 B1, WO 2016015769, EP 3016306 A1, WO 2005/119951 A1 discloses a time synchronization method, wherein a master broadcasts a synchronization massage to all participants in order to perform the time synchronization. Furthermore, the state of the art discloses backup-masters, which take over the master role upon disconnection of the recent master. However, no synchronization path is disclosed.

EP 2544389 A1 discloses a time synchronization, wherein a time-sync master is supported by a rate-sync master in the respective domain. The time synchronization in the respective domain is performed along a synchronization path, however working rate and time rate, of the respective time and rate master, are not changed. Based on these messages the slave calculates and corrects it's network time.

SUMMARY

Embodiments are directed to an improved synchronization of participants of a real-time network.

According to embodiments, using the synchronization packets starting from the synchronization master along the synchronization path, the local network time the participants along the synchronization path is synchronized with the local network time of the synchronization master, and that the participants, at the time the respective synchronization packet is sent, transmit a time stamp of their local time with the synchronization packet, and that the participants (11, 12, 13) calculate for a port (11[2], 12[1], 12[2], 13[1]), via which a synchronization packet (D1[2], D2[1], D2[2], D3[1]) is received, a difference time (td1[2], td2[1], td2[2], td3[1]) from a difference between the time stamp received in the synchronization packet (D1[2], D2[1], D2[2], D3[1]) and a time stamp of their local time (t1, t2, t3) when receiving the relevant synchronization packet (D1[2], D2[1], D2[2], D3[1]) n, wherein the local network time (tn1, tn2, tn3) of the participants is synchronized using the difference time (td1[2], td2[1], td2[2], td3[1]).

Embodiments are directed to a real-time network in which the participants are configured to transmit synchronization packets to connected participants, wherein one participant of the real-time network is designated as the synchronization master and the other participants are configured to synchronize their local network time with the local network time of the synchronization master using the synchronization packets. The participants of the real-time network, apart from the synchronization master, are viewed as additional participants. The local network time of the synchronization master is thus used as the basis for global network time, wherein the global network time may also correspond to the local network time of the synchronization master. The participants of the real-time network cyclically exchange synchronization packets and use them in order to synchronize with the local time of the synchronization master. There is no need for a specific participant to be implemented or predefined as a synchronization master; the synchronization master may basically be arbitrarily selected. However, a central processing unit is preferably used as the synchronization master.

The method according to the disclosed embodiments may be implemented in a simple manner on the participants in hardware (for example, in an ASIC or an FPGA—Field Programmable Gate Array, an integrated circuit (IC) of digital technology, in which a logic circuit may be loaded) and still enables a more precise synchronization of the local times of the participants as provided, for example, in the X2X protocol. Nevertheless, the structure of the method according to the invention is significantly less complex than, for example, in the comparably precise PTP synchronization method. Thus overhead may be saved with comparable synchronization accuracy or a higher synchronization accuracy may be achieved with comparable overhead.

At the point in time each synchronization packet is sent, the participants preferably transmit a time stamp of their local time with the synchronization packet. The participants calculate a difference time for a port via which a synchronization packet is received from a difference between the time stamp received in the synchronization packet and a time stamp of their local time when the relevant synchronization packet is received. No difference time is calculated for a port via which no synchronization packet is received. The local network time of the participants is also synchronized to the local network time of the synchronization master using the respective difference times.

Starting from the synchronization master, a synchronization path extending via the further participants is preferably specified, the local network times of the additional participants along the synchronization path being synchronized to the local network time of the synchronization master.

If the real-time network is linear and a participant is provided at one end of the real-time network as the synchronization master, then the synchronization path may be viewed as the synchronization direction. If the real-time network is linear and if a participant is provided in the middle (i.e. not at one end) of the real-time network as the synchronization master, then the synchronization path extends in two synchronization directions (starting from the synchronization master). If the real-time network is branched and a participant that forms the branch is provided as the synchronization master, then the synchronization path extends in three or more (depending on the type of branching) synchronization directions (starting from the synchronization master).

Several participants may also be designated as synchronization masters in a real-time network, wherein an associated synchronization path is provided for each master.

The participants preferably each transmit a network time deviation of one of their other ports with the synchronization packet. The participants calculate the network time deviation of the ports via which a synchronization packet is received, in each case from the sum of the calculated difference time and a network time deviation received in the synchronization packet.

If a participant has two ports, it transmits via one port the network time deviation of the other port. If a participant has more than two ports, it is then specified from which port(s) to which port(s) the network time deviation is forwarded. If a synchronization path is known, the synchronization path may then specify which port(s) are assigned to which port(s) for forwarding the network time deviation, wherein the network time deviation is able to be forwarded along and opposite to the synchronization path.

The synchronization master preferably transmits in each case a predetermined network time deviation along the synchronization path with the synchronization packet. This may also be interpreted in such a way that the synchronization master is specified a network time deviation for ports that are arranged opposite to the synchronization path, which is then transmitted via the port along the synchronization path. The participants calculate their local network time from the difference between their local time and the network time deviation of the port arranged opposite to the synchronization path.

Since the synchronization path originates from the synchronization master, the port that is not in the direction of the synchronization path is viewed as "arranged opposite to the synchronization path" and is preferably specified a network time deviation, preferably zero. A network time deviation of zero is specified for ports via which no synchronization packet is received.

The previously specified network time deviation, which of course may also be zero, applies to the ports of the synchronization master arranged opposite to the synchronization path.

The synchronization path therefore specifies the participants and ports along which the local network time is synchronized.

The participants may correct the network time deviation of the ports via which a synchronization packet is received by a signal propagation time of the received synchronization packet.

For this purpose, the participants may transmit in each case the difference time of the ports via which the respective synchronization packet is sent with the synchronization packet. The participants may further calculate the signal transit time of the received synchronization packet from the difference time received with the synchronization packet and the difference time of the port via which the synchronization packet is received, preferably from half the difference between the received difference time and the difference time of the port via which the synchronization packet is received.

The time difference may be filtered by the participants. In this way, measurement inaccuracies and quantization effects may be reduced.

Furthermore, the participants may calculate and preferably filter a network time deviation difference from a current network time deviation in an instantaneous cycle and a network time deviation from a previous cycle, wherein the calculated and preferably filtered network time deviation difference is added to the instantaneous network time deviation in the instantaneous cycle in order to obtain a corrected network time deviation difference, and the corrected network time deviation difference replaces the original current network time deviation. Deviations in the synchronized network time due to oscillator tolerances may thereby be compensated.

If the defined synchronization master ceases, another participant is preferably defined as the new synchronization master. This can be done explicitly or implicitly, i.e., automatically. However, a new synchronization path may be defined starting from the new synchronization master. In particular, if a synchronization master fails at one end of the real-time network, the participant now at the end may also serve as the synchronization master. Since the synchronization path in this case does not change, the participants continue to calculate their local network time from the difference between their local time and the network time deviation of a port arranged opposite to the synchronization path, which therefore does not change either. Thus, the real-time network remains synchronized even if the previous synchronization master ceases. During operation, a different participant may, in principle, (i.e., also without the failure of the former synchronization master) also be defined as the synchronization master, which may be necessary, for example, to change an operating mode in the real-time network.

The synchronization packet is preferably transmitted in ISO-OSI layer 2 in each case. This creates a particularly low overhead.

The participants in the real-time network are preferably connected to one another in a linear manner. However, the real-time network may also have a non-linear structure, for example a branched or ring-shaped structure. A branched structure differs from a linear structure in that there are also participants that not only have one or two adjacent participants, but also three or more adjacent participants.

The real-time network may represent an X2X+ network. X2X+ is a serial real-time network, the participants of which are connected to one another via switches. These switches are usually X20 bus modules that are plugged in one behind the other, but could also be differently designed. A data transmission in an X2X+ real-time network corresponds to the LVDS (Low Voltage Differential Signaling) standard, an interface standard for high-speed data transmission. At 512 Mbps, the data rate is very high and no clock signal is transmitted. For this reason, the clock signal is restored at the receiver of the signal.

The synchronization packet may comprise one or multiple frames including synchronization information. The synchronization packet may be transmitted in a management frame, since the associated management channel has the highest priority and a channel may be interrupted by one with a higher priority. A management frame with a synchronization packet is preferably generated every 4 microseconds. A time stamp of the local time and the start of management symbol may be generated in the process. The end of the management frame is marked by the end-of-management symbol.

Instead of a linear real-time network, a branched real-time network may also be provided. In this case, the synchronization direction may be branched in order to reach all participants via synchronization packets.

Other exemplary embodiments and advantages of the present invention may be ascertained by reviewing the present disclosure and the accompanying drawing.

BRIEF DESCRIPTION OF THE DRAWINGS

The present invention is described in greater detail below with reference to FIG. 1A through 2C which show, by way of example, advantageous embodiments of the invention in a schematic and non-limiting manner. In the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
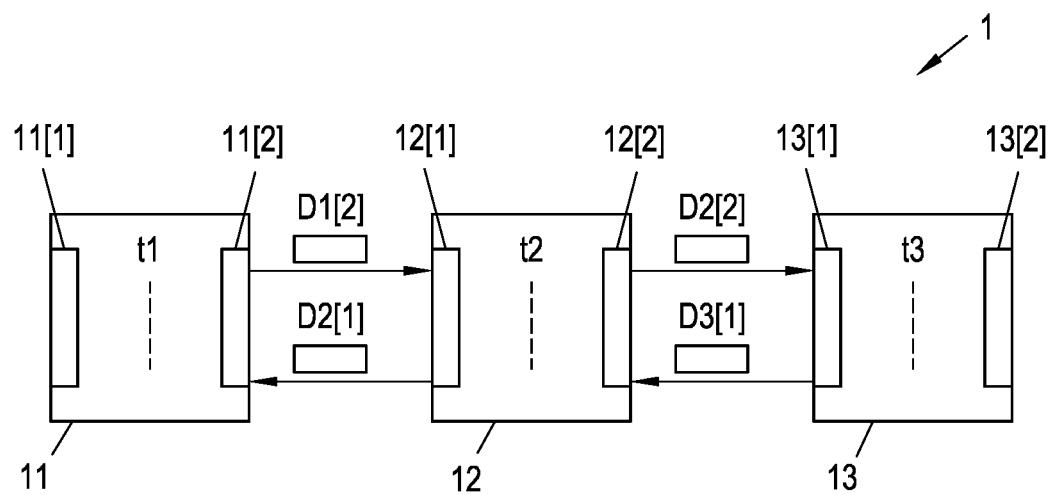
FIG. 1A shows a linear real-time network comprising three participants.

In FIG. 1A, a linear real-time network 1 is shown, comprising three participants 11, 12, 13. It is assumed that each participant 11, 12, 13 has a first port 11[1], 12[1], 13[1] and a second port 11[2], 12[2], 13[2]. The participants 11, 12, 13 each have a local time t1, t2, t3, which is determined by an associated counter. The local time t1, t2, t3 of the participants 11, 12, 13 is not synchronous with one another due to oscillator tolerances. A local network time tn1, tn2, tn3 is also provided for the participants 11, 12, 13, which is derived from the respective local time t1, t2, t3. However, the local network times tn1, tn2, tn3 of the participants 11, 12, 13 are not synchronous with one another.

If participants are linearly connected to one another in a real-time network, this means that a participant at one end of the linear real-time network is connected to another participant only via one port, whereas the other port (or the other ports) is/are occupied. A participant at another end of the linear real-time network is likewise only connected to another participant via one port, whereas the other port (or the other ports) is/are not occupied. The participants that are arranged in a linear real-time network between the participants arranged at the end, are each connected to other participants via two ports.

In FIG. 1A, this means that the first port 11[1] of the first participant 11 and the second port 13[2] of the third participant 13 are not occupied, since the first participant 11 and the third participant 13 each represent one end of the linear real-time network 1. The second participant 12 is located between the participants 11, 13 arranged at the end and is connected via its first port 12[1] to the second port 11[2] of the first participant 11 and is connected via its second port 12[2] to the first port 13[1] of the third participant 13.

The participants 11, 12, 13 are configured in such a way that they exchange synchronization packets D1[2], D2[1], D2[2], D3[1] with their adjacent participants. The first participant 11 transmits a data packet D1[2] via its second port 11[2] to the second participant 12, which receives the data packet D1[2] at its first port 12[1]. The second participant 12 transmits a data packet D2[1] via its first port 12[1] to the first participant 11, which receives the data packet D2[1] at its second port 11[2]. The second participant 12 also transmits a data packet D2[2] to the third participant 13, which receives the data packet D2[2] at its first port 13[1]. The third participant 13 transmits a data packet D3[1] via its first port 13[1] to the second participant 12, which receives the data packet D3[1] at its second port 12[1].

Figure 1B:
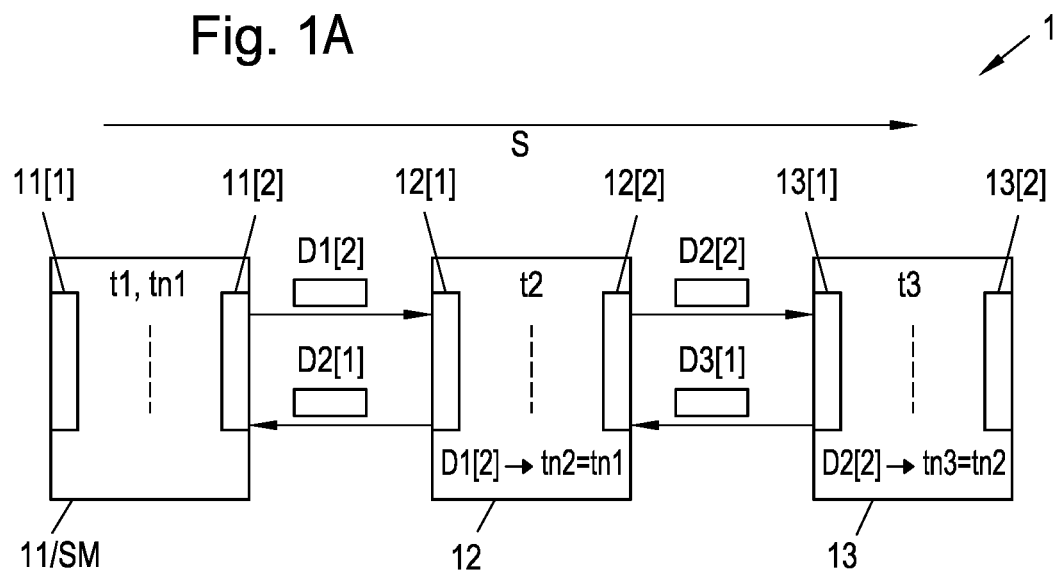
FIG. 1B shows the linear real-time network with a synchronization master at the end of the real-time network.
Figure 1C:
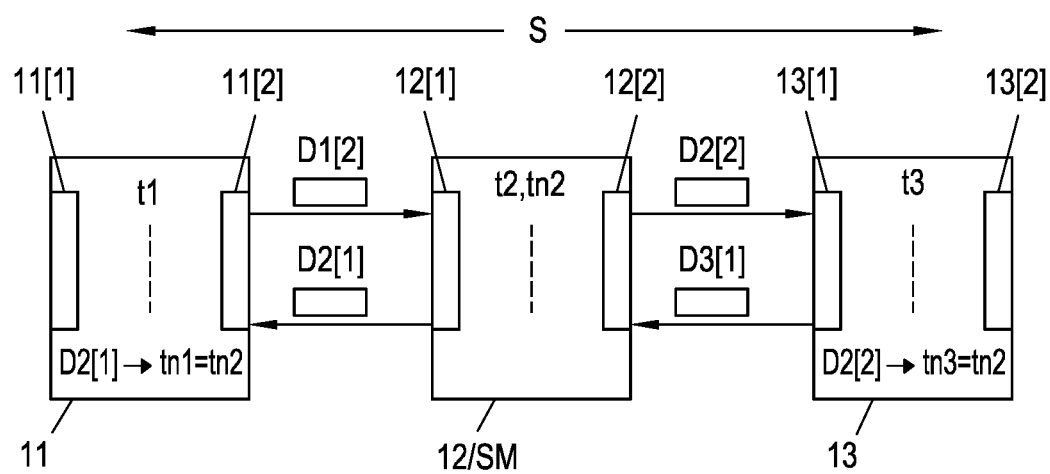
FIG. 1C shows the linear real-time network with a synchronization master in the middle of the real-time network.

According to the invention, one of the participants 11, 12, 13 is now designated as the synchronization master SM. FIG. 1B shows the real-time network 1 from FIG. 1A, wherein the first participant 11 is selected as the synchronization master SM. In FIG. 1C, the second participant 12 is selected as the synchronization master SM. Using the synchronization packets D1[2], D2[1], D2[2], D3[1], the local network time tn1, tn2, tn3 of the other participants 11, 12, 13 is synchronized with the local network time tn1, tn2, tn3 of the synchronization master SM.

A synchronization path S via the other participants 11, 12, 13 of the real-time network 1 is preferably specified starting from the synchronization master SM. In FIG. 1B, starting from the first participant 11 as the synchronization master SM, the path to the right via the second and third participants 12, 13 logically results as synchronization path S. This means that the synchronization path S leads from the first participant 11 via its second port 11[2] to the first port 12[1] of the second participant 12 and further via its second port 12[2] to the first port 13[1] of the third participant 13 and ends at the third participant 13. In FIG. 1C, however, this means that the synchronization path S, starting from the second participant 12 as the synchronization master SM, leads to the left and to the right in order to reach all additional participants 11, 13. The synchronization path S therefore leads starting from the second participant 12 via its first port 12[1] to the second port 11[2] of the first participant 11, similarly leads from the second participant 12 via its second port 12[2] to the first port 13[1] of the third participant 13.

If the real-time network 1 from FIG. 1B were configured as a ring network (not shown), i.e., the second port 13[2] of the third participant 13 were connected to the first port 11[1] of the first participant 11, then starting from the first participant 11 as synchronization master SM, as in FIG. 1B, a synchronization path S would be possible via the second participant 12 to the third participant 13, where the synchronization path S ends. However, a synchronization path S would be possible in the aforementioned ring network starting from the first participant 11 via its first port 11[1] to the second port 13[2] of the third participant 13 and further via the first port 13[1] of the third participant to the second port 12[2] of the second participant 12, where the synchronization path S ends. Similarly, a split synchronization path S would be possible in the aforementioned ring network starting from the first participant 11, i.e., via its first port 11[1] to the second port 13[2] of the third participant 13 and also via its second port 11[2] to the first port 12[1] of the second participant 12, with the synchronization path S ending at the second and third participant 12, 13.

According to the invention, the local network time tn1, tn2, tn3 of the participants located along the synchronization path S is synchronized using the synchronization packets D1[2], D2[1], D2[2], D3[1] with the local network time tn1, tn2, tn3 of the synchronization master SM, starting from the synchronization master SM and along the synchronization path S.

This means that in FIG. 1B, the second participant 12 synchronizes its local network time tn2 to the local network time tn1 of the first participant 11, wherein the data packet D1[2] is used. The third participant 13 synchronizes its local network time tn3 with the local network time tn2 of the second participant 12 and thus to the local network time tn1 of the first participant 11, wherein the data packet D2[2] is used. The first participant 11 as the synchronization master SM thus specifies its local network time tn1 as the global network time if zero is specified as the network time deviation td10[1]. Otherwise, the specified network time deviation td10[1] at the synchronization master SM determines how far its local time t1 deviates from the global network time.

In FIG. 1C, the second participant 12 as synchronization master SM specifies its local network time tn2 as the global network time, whereby the local network time tn1 of the first participant 11 is synchronized with the local network time tn2 of the second participant 12, wherein the data packet D2[1] is used. Similarly, the third participant 13 synchronizes its local network time tn3 with the local network time tn2 of the second participant 12, wherein the data packet D2[2] is used.

Figure 2A:
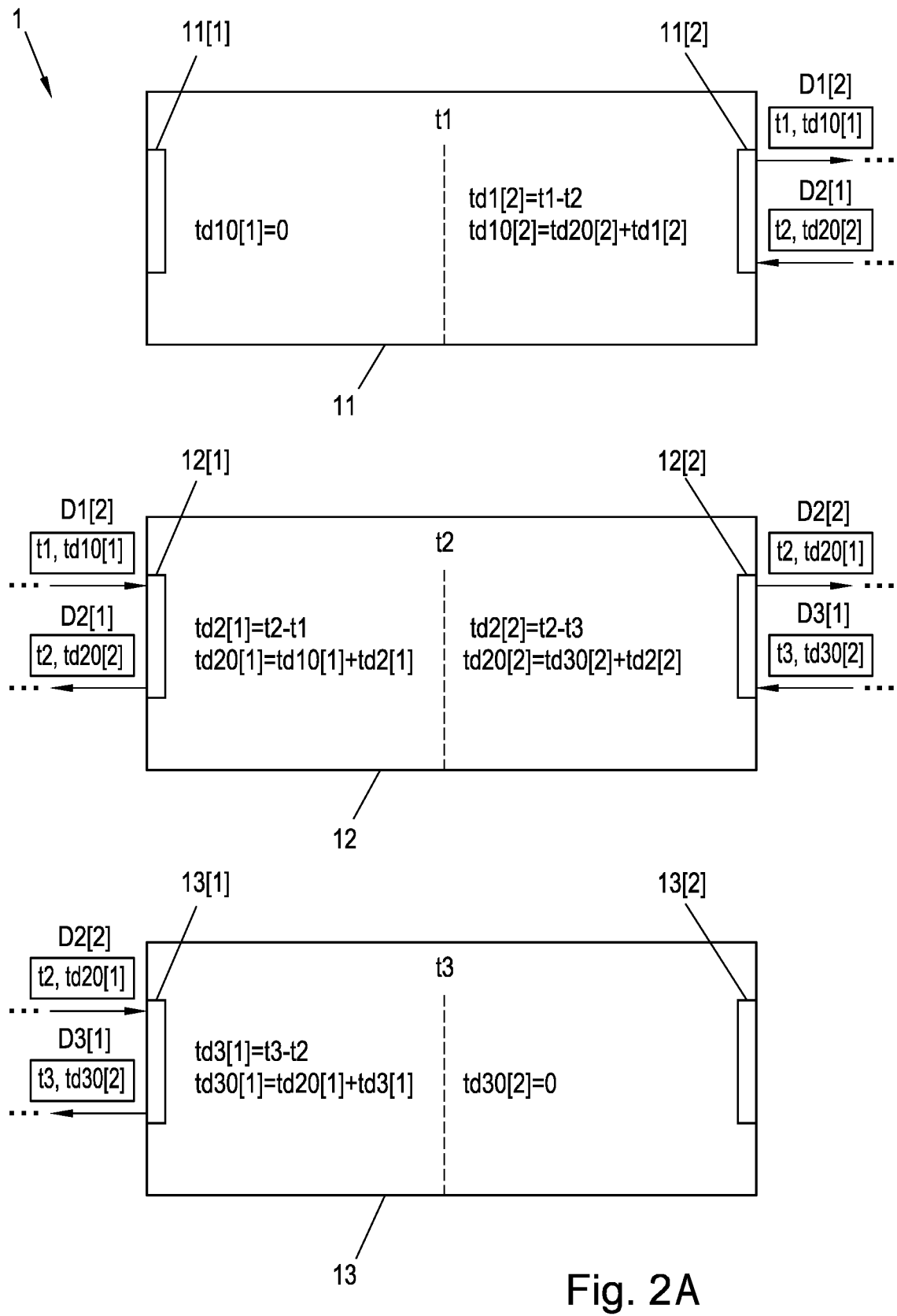
FIG. 2A shows a preferred embodiment of the real-time network from FIG. 1A.
Figure 2B:
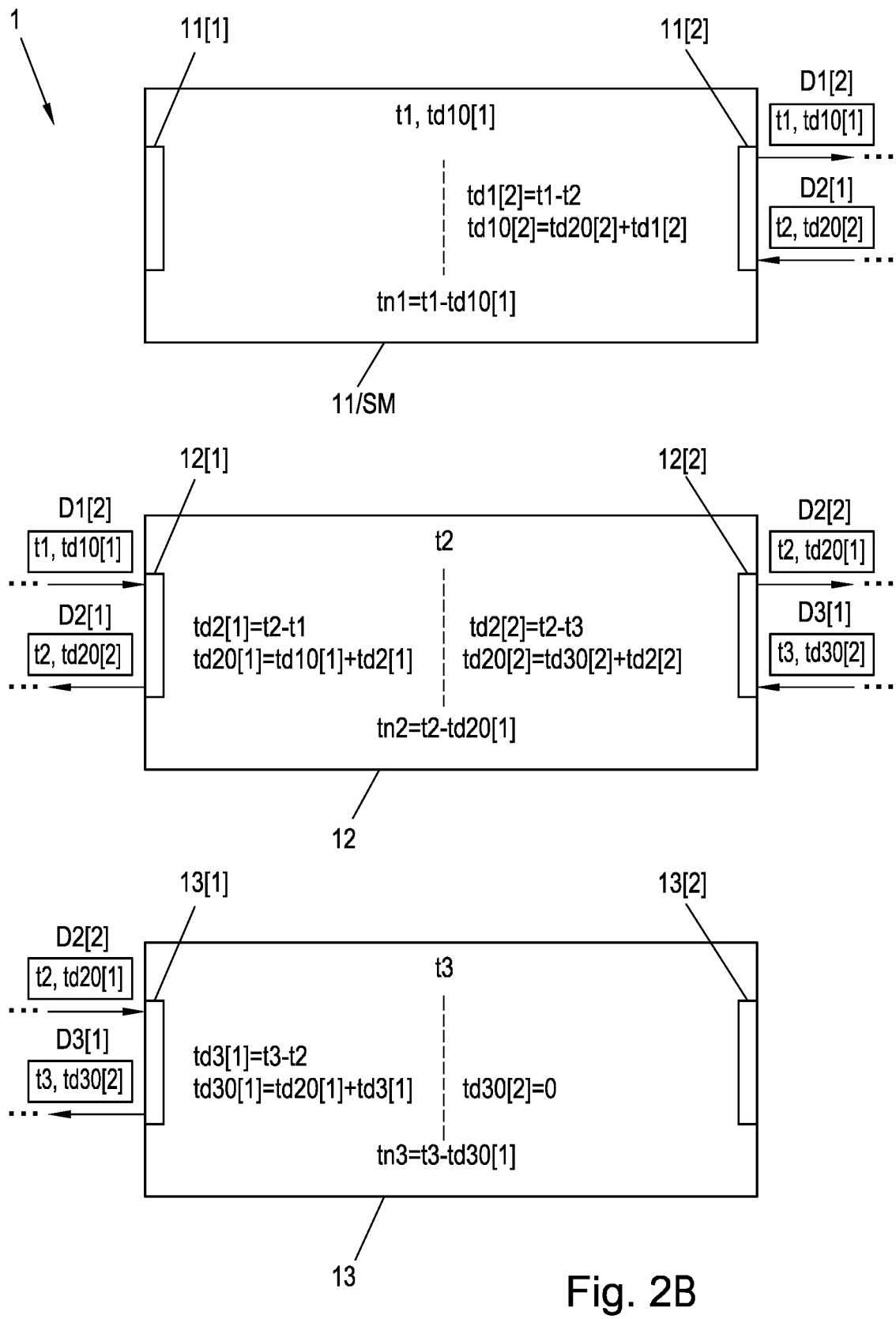
FIG. 2B shows a preferred embodiment of the real-time network from FIG. 1B.

FIG. 2A shows a preferred embodiment, wherein the real-time network 1 corresponding to FIG. 1A is used. In FIG. 2B, as in FIG. 1B, the first participant 11 is used as the synchronization master SM and in FIG. 2C, as in FIG. 1C, the second participant 12 is used as the synchronization master SM.

Participants 11, 12, 13 preferably calculate for the ports 11[2], 12[1], 12[2], 13[1] via which a synchronization packet D1[2], D2[1], D2[2], D3[1] is received, in each case a difference time td1[2], td2[1], td2[2], td3[1], whereupon the local network time tn1, tn2, tn3 of the participants 11, 12, 13 using the difference times td1[2], td2[1], td2[2], td3[1] is synchronized. For this purpose, a time stamp of their local time t1, t2, t3 is formed by the participants 11, 12, 13 at the point in time the respective synchronization packet D1[2], D2[1], D2[2], D3[1] is sent, and is transmitted with the synchronization packet D1[2], D2[1], D2[2], D3[1]. The participants 11, 12, 13 also form a time stamp of their local time t1, t2, t3 at the point in time the respective synchronization packet D1[2], D2[1], D2[2], D3[1] is received. To ascertain the difference time td1[2], td2[1], td2[2], td3[1] of a port 11[2], 12[1], 12[2], 13[1], the difference between the time stamp, which is formed when a synchronization packet D1[2], D2[1], D2[2], D3[1] is received and the time stamp which is received with this synchronization packet D1[2], D2[1], D2[2], D3[1] is calculated.

For the real-time network according to FIG. 2A, this means that the first participant 11 transmits a time stamp of its local time t1 with the data packet D1[2]. Upon receipt of the data packet D1[2], the second participant determines a time stamp of its local time t2 and calculates its difference time td2[1] for the first port 12[1] from the difference between the time stamps: td2[1]=t2−t1.

Likewise, the second participant 12 transmits a time stamp of its local time t2 to the first participant 11 with the data packet D2[1] and a time stamp of its local time to the third participant 13 with the data packet D2[2]. Upon receipt of the data packet D2[1], the first participant 11 ascertains a time stamp of its local time t1 and calculates its difference time td1[2] at the second port 11[2] from the difference between these time stamps: td1[2]=t1−t2. The third participant 13 ascertains upon receipt of the data packet D2[2] a time stamp of its local time t3 and calculates its difference time td3[1] for the first port 13[1] from the difference between these time stamps: td3[1]=t3−t2.

Likewise, the third participant 13 transmits a time stamp of its local time t3 to the second participant 12 with the data packet D3[1]. The second participant 12 ascertains upon receipt of the data packet D3[1] a time stamp of its local time t2 and calculates its difference time td2[2] for the second port 12[2] from the difference between these time stamps: td2[2]=t2−t3.

No difference time td1[1] td3[2] is formed for ports via which no synchronization packet is received. In FIG. 2A, the first participant 11 receives no synchronization packet via its first port 11[1] nor the third participant 13 via its second port 13[2].

The participants 11, 12, 13 preferably transmit in each case with the synchronization packet D1[2], D2[1], D2[2], D3[1] a network time deviation td10[1], td20[1], td20[2], td30[2] of another port of the participant 11, 12, 13. A participant 11, 12, 13, if it has two ports 11[1], 11[2], 12[1], 12[2], 13[1], 13[2], transmits in each case via a port 11[1], 11[2], 12[1], 12[2], 13[1], 13[2] the network time deviation of the (exactly one) other port 11[1], 11[2], 12[1], 12[2], 13[1], 13[2]. If a participant 11, 12, 13 has more than two ports, it is specified (for example, in advance) from which ports to which ports the network time deviation is forwarded. This assignment of the ports of a participant may take place in one direction or in both directions. If a synchronization path S is known, the synchronization path S may then specify from which ports to which ports the network time deviation is forwarded. It may be provided that the network time deviation is forwarded only in the direction of the synchronization path S, or forwarded in accordance with the port assignment of the synchronization path S without taking the direction into account (i.e., in the direction of the synchronization path S and opposite the direction of the synchronization path S).

This means, viewed along the synchronization path S, that the first participant 11 with the data packet D1[2] transmits a network time deviation td10[1] of its first port 11[1] to the second participant 12 via the second port 11[2] and the second participant 12 with the data packet D2[2] transmits a network time deviation td20[1] of its first port 12[1] to the third participant 13 via its second port 12[2].

In addition, the third participant 13 may transmit a network time discrepancy td30[2] of its second port 13[2] to the second participant 12 with the data packet D3[1] via the first port 13[1] opposite to the synchronization path S, and the second participant 12 with the data packet D2[1] may transmit a network time deviation td20[2] of its second port 12[2] to the first participant 11 via its first port 12[1]. For a better illustration, however, only one transmission of the network time deviation in the direction of the synchronization path S is considered below.

However, in order to determine the network time deviation td10[2], td20[1], td20[2], td30[1] of a port 11[2], 12[1], 12[2], 13[1] via which a synchronization packet D2[1], D1[2], D3[1], D2[2] is received, the former is obtained from the already calculated difference time td1[2], td2[1], td2[2], td3[1] and in turn from a network time deviation td10[2], td20[1], td20[2], td30[1] received in the synchronization packet D2[1], D1[2], D3[1], D2[2].

To start the calculation of the network time deviation td10[1], td20[1], td20[2], td30[2], initial values, preferably zero, may initially be specified for the network time deviation td10[1], td10[2], td20[1], td20[2], td30[1], td30[2].

For ports 11[1], 13[2] via which no synchronization packet is received, a network time deviation td10[1], td30[2] of zero may be specified.

For FIG. 2A, a network time deviation td10[1] of zero is specified for the network time deviation td10[1] of the first port 11[1] of the first participant 11. This network time deviation td10[1] of the first port 11[1] is transmitted to the second participant 12 via the other, second port 11[2] of the first participant 11.

The second participant 12 thus receives the network time deviation td10[1] with the first data packet D1[2] at its first port 12[1] and uses the difference time td2[1] of its first port 12[1] to calculate the network time deviation td20[1]=td10[1]+td2[1] of the first port 12[1]. This network time deviation td20[1] of the first port 12[1] is transmitted to the third participant 13 in the data packet D2[2] via the other, second port 12[2]. The third participant 13 receives the data packet D2[2] at its first port 13[1] and uses the difference time td3[1] of the first port 13[1] to calculate the network time deviation td30[1] of the first port 13[1] as td30[1]=td20[1]+td3[1].

In the step of calculating the local network time tn1, tn2, tn3 of the participants 11, 12, 13, the synchronization path S is advantageously taken into account. In this way, the network time tn1, tn2, tn3 of the participants 11, 12, 13 is calculated from the difference between their local time t1, t2, t3 and the network time deviation (in FIG. 2B td10[1], td20[1], td30[1]) of ports arranged opposite to the synchronization path S (in FIG. 2B 11[1], 12[1], 13[1]). The selection of the synchronization master SM and thus the synchronization path S therefore specifies to the participants 11, 12, 13 from which port they should calculate the local network time tn1[1], tn2[1], tn3[1], wherein in each case the port opposite to the synchronization path S is selected. As mentioned, the synchronization path S may be disregarded when transmitting the network time deviation.

In FIG. 2B, the first participant 11 is selected as the synchronization master SM. The local network time tn1 of the first participant 11 is thus calculated from the difference between its local time t1 and the network time deviation td10[1] of the first port 11[1]. The network time deviation td10[1] is specified, preferably with td10[1]=0, whereby with a network time deviation td10[1] of zero the local time t1 of the first participant 11 specifies its local network time tn1: tn1=t1−td10[1]=t1. The other participants 12, 13 synchronize their local network time tn2, tn3 with the local network time tn1 of the first participant 11. As explained above, the first participant 11 transmits its specified network time deviation td10[1] with the data packet D1[2] to the second participant 12. The second participant 12 calculates its local network time tn2 using the (preferably already calculated) network time deviation td20[1] of the first port 12[1], since this is opposite the synchronization path S, as tn2=t2−td20[1]. As explained above, the second participant 12 transmits its network time deviation td20[1] with the data packet D2[2] to the third participant 13, which calculates its local network time tn3 using its (already calculated) network time deviation td30[1] of the first port 13[1], since this is opposite the synchronization path, as tn3=t3−td30[1]. Thus, the local network time tn2, tn3 of the second participant 12 and of the third participant 13 are synchronized in FIG. 2B with the network time tn1 of the first participant 11 as synchronization master SM.

Figure 2C:
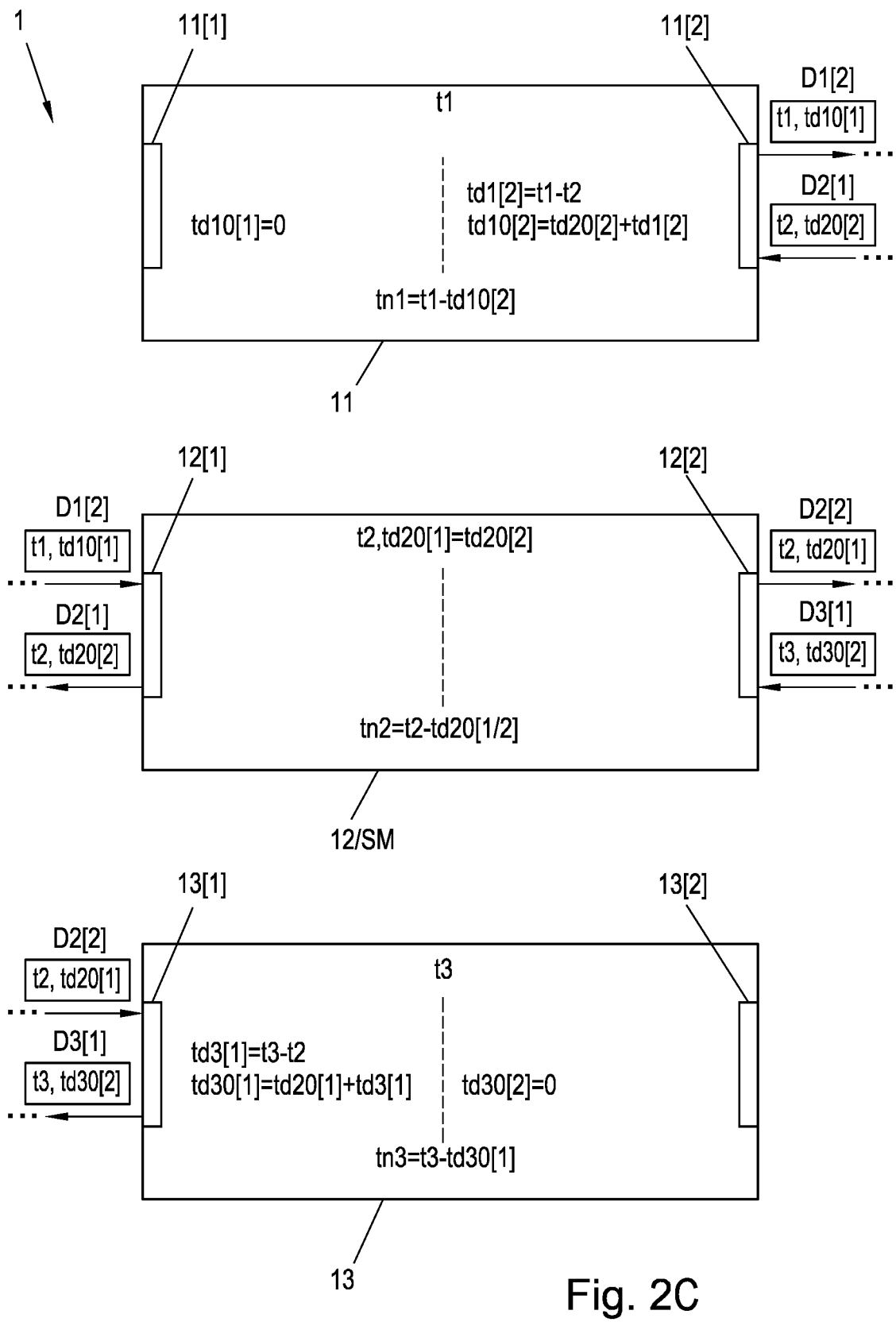
FIG. 2C shows a preferred embodiment of the real-time network from FIG. 1C.

In FIG. 2C, the second participant 12 is designated as synchronization master SM. A synchronization path S via the other participants 11, 13 of the real-time network 1 is specified starting from the synchronization master SM. For FIG. 2C, this means, as previously for FIG. 1C, that the synchronization path S, starting from the second participant 12 as synchronization master SM, leads via the first port 12[1] to the first participant 11 and via the second port 12[2] to the third participant 13.

By selecting the synchronization path S, the participants 11, 12, 13 are specified, starting from which port 11[1], 11[2], 12[1], 12[2], 13[1], 13[2] they are to calculate the local network time tn1, tn3, wherein in each case the port 11[1], 11[2], 12[1], 12[2], 13[1], 13[2] opposite to the synchronization path S is selected. The second participant 12 is the synchronization master SM, which is why, using the synchronization packet D2[1], D2[2], it transmits a specified network time deviation td20[1], td20[2] along the synchronization path (S), i.e., via the ports 12[1], 12[2]. Thus, the second participant 12 is specified the network time deviation td20[1]=td20[2], preferably zero, for the ports 12[1], 12[2].

For the second participant 12, therefore, the difference times td2[1], td2[2] of ports 12[1], 12[2] are also not taken into account (the network time deviations td20[1] td20[2] are already specified), but rather, the local network time tn2 is calculated directly from the difference between the local time t2 and the specified network time deviation td20: tn2=t2−td20.

Due to the specified synchronization path S, the first participant 11 takes into account the network time deviation td10[2] of the second port 11[2] when calculating its local network time tn1 (since its second port 11[2] is opposite the synchronization path S): tn1=t1−td10[2]. Similarly, when calculating its local network time tn3, the third participant 13 takes into account the network time deviation td30[1] of the first port 13[1] (since its first port 13[1] is opposite the synchronization path S): tn3=t3−td30[1].

The local network time tn1, tn3 of the first and third participants 11, 13 is thus synchronized with the local network time tn2 of the second participant 12.

The (specified) network time deviation td20 of the second participant 12 (synchronization master SM) describes, as mentioned, the difference between its local time t2 and the global network time.

Participants 11, 12, 13 preferably correct their network time deviations td10[1], td10[2], td20[1], td20[2], td30[1], td30[2] each by a signal delay time tt1[2], tt2[1], tt2[2], tt3[1]. This can be done by transmitting in each case the difference time td1[2], td2[1], td2[2], td3[1] in the synchronization packet D1[2], D2[1], D2[2], D3[1] of the port 11[2], 12[1], 12[2], 13[1], via which the synchronization packet D1[2], D2[1], D2[2], D3[1] is sent (not shown in the figures). Participants 11, 12, 13 calculate their signal propagation time tt1[2], tt2[1], tt2[3], tt3[1] at a port 11[2], 12[1], 12[2], 13[1] from half the difference between the difference time td1[2], td2[1], td2[2], td3[1] received at this port 11[2], 12[1], 12[2], 13[1] in the synchronization packet D1[2], D2[1], D2[2], D3[1] and the difference time td1[2], td2[1], td2[2], td3[1] ascertained for this port. This occurs on the assumption that the transfer time between adjacent participants 11, 12, 13 is in each case identical to one another.

For the real-time network 1 according to FIGS. 2A-2C, this means that the first participant 11 transmits its difference time td1[2] in the data packet D1[2] and receives the difference time td2[1] of the second participant 12 in the data packet D2[1]. The signal propagation time tt1[2] at its port 11[2] then results from tt1[2]=(td1[2]+td2[1])/2. The first participant is thus able to correct the network time deviation td10[2] of port 11[2] by the signal propagation time tt1[2]: td10[2]=td10[2]−tt1[2]. The second participant 12 calculates its signal propagation time tt2[1] at its port 12[1] according to tt2[1]=(td2[1]+td1[2])/2, with which it is able to correct the network time deviation td20[2] of its port 12[1] by the signal transit time tt2[1]: td20[1]=td20[1]−tt2[1].

The second participant 12 transmits its time difference td2[2] in the data packet D2[2] and receives the time difference td3[1] of the third participant 13 in the data packet D2[1]. The signal propagation time tt2[2] at its port 12[2] then results from tt2[2]=(td2[2]+td3[1])/2. The second participant is thus able to correct the network time deviation td20[2] of its port 12[2] by the signal propagation time tt2[2]: td20[2]=td20[2]−tt2[2]. The third participant 13 calculates its signal propagation time tt3[1] at its port 13[1] according to tt3[1]=(td3[1]+td2[2])/2, with which it is able to calculate the network time deviation td30[1] of its port 13[1] by the signal transit time tt3[1]: td30[1]=td30[1]−tt3[1].

The difference times td1[2], td2[1], td2[2], td3[1] are preferably filtered in each case after they have been ascertained in order to minimize jitter and quantization effects. A filter with an exponential smoothing function is preferably used for this purpose. It is also possible to filter difference times td1[2], td2[1], td2[2], td3[1], corrected by signal propagation times tt1[2], tt2[1], tt2[2], tt3[1], The transmission of the synchronization packets D1[2], D2[1], D2[2], D3[1] between the participants and the associated synchronization of the network time tn1, tn2, tn3 of the participants 11, 12, 13 each requires a certain period of time. Since the counters of participants 11, 12, 13, which are each used to determine the local times t1, t2, t3, count at different speeds due to oscillator tolerances, the network times tn1, tn2, tn3 of participants 11, 12, 13 (which are derived of course from the local times t1, t2, z3 of the participants 11, 12, 13) may drift apart between the synchronization points in time. In the case of a line topology of participants 11, 12, 13, this is especially pronounced due to the chained forwarding of the synchronization packets D1[2], D2[1], D2[2], D3[1]. A difference between the current network time deviation td10[1], td20[1], td20[2], td30[2] in the current cycle n and the network time deviation td10[1], td20[1], td20[2], td30[2] is preferably calculated in each case from a previous cycle (for example, from the immediately preceding cycle n−1), which results in a network time deviation difference that describes the drift. Since the deviations in the counting speeds of the counters may change over time, multiple measurements of the network time deviation difference is advantageous. The network time deviation difference is preferably determined in each synchronization cycle.

The network time deviation difference may be filtered, which results in a filtered network time deviation difference. If this filtered network time deviation difference is added to the instantaneous network time deviation in the instantaneous cycle n, a compensated network time deviation results, which may be used instead of the original network time deviation td10[1], td20[1], td20[2], td30[2] to compensate for deviations of the synchronized network time due to oscillator tolerances. By filtering the network time deviation difference, the accuracy of the compensated network time deviation may even exceed the measurement resolution if the network time deviation is monotonic and the network time deviation difference is at least approximately constant. The accuracy may be increased, in particular, if the inertia of the change in frequency is greater than the filter length, which is still the case with large filter lengths as well, since the change in frequency is only caused by temperature changes and aging processes and these processes are very slow.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for synchronizing respective local network time of components of a real-time network, wherein the components are connected to one another via ports to define a synchronization path and the components each transmit synchronization packets to connected components through the ports, wherein a component of the real-time network is designated as a synchronization master, and using the synchronization packets, the local network time of other components not designated as the synchronization master, is synchronized with the local network time of the synchronization master, the method comprising:
using the synchronization packets starting from the synchronization master along the synchronization path, synchronizing the local network time of the other components along the synchronization path with the local network time of the synchronization master;
wherein the components, at a time at which a synchronization packet is transmitted to the connected component, transmit a time stamp of their local time with the synchronization packet, and
wherein each of the components calculate for a port, via which the synchronization packet is received from a respective connected component, a difference time from a difference between the time stamp received in the synchronization packet and a time stamp of their local time when receiving the synchronization packet from the respective connected component, and
synchronizing the local network time of the other components using the calculated difference time.

2. The method according to claim 1, wherein the components each cyclically transmit the synchronization packets to the connected components.

3. The method according to claim 1, wherein the components transmit with the synchronization packet, a network time deviation for each of one of their other ports, and
wherein the components calculate the network time deviation of the ports via which a synchronization packet is received, in each case from a sum of the calculated difference time and of the network time deviation received in the synchronization packet.

4. The method according to claim 3, wherein, starting from the synchronization master, the synchronization path extending via the additional components is specified, and
wherein the local network time of the further components along the synchronization path is synchronized with the local network time of the synchronization master.

5. The method according to claim 4, wherein the synchronization master in each case transmits a specified network time deviation with the synchronization packet along the synchronization path,
wherein, for ports via which no synchronization packet is received, a network time deviation of zero is specified, and
wherein the components calculate their local network time from a difference between their local time and the network time deviation of the port arranged opposite to the synchronization path.

6. The method according to claim 3, wherein the participants correct the network time deviation of the ports, via which a synchronization packet is received by a signal propagation time of the received synchronization packet.

7. The method according to claim 6, wherein the components each transmit the difference time of the ports via which the respective synchronization packet is sent with the synchronization packet,
wherein the components calculate the signal propagation time of the received synchronization packet from the difference time received with the synchronization packet and the difference time of the port via which the synchronization packet is received.

8. The method according to claim 7, wherein the components calculate the signal propagation time of the received synchronization packet from half a difference of the difference time received with the synchronization packet and a difference time of the port via which the synchronization packet is received.

9. The method according to claim 3, wherein the components calculate a network time deviation difference, in each case from an instantaneous network time deviation in an instantaneous cycle and a network time deviation from a previous cycle,
wherein the calculated network time deviation difference is added to a current network time deviation in the instantaneous cycle in order to obtain a corrected network time deviation difference, and
wherein the corrected network time deviation difference replaces the original instantaneous network time deviation.

10. The method according to claim 3, wherein the components calculate and filter a network time deviation difference, in each case from an instantaneous network time deviation in an instantaneous cycle and a network time deviation from a previous cycle,
wherein the calculated and filtered network time deviation difference is added to a current network time deviation in the instantaneous cycle in order to obtain a corrected network time deviation difference, and
wherein the corrected network time deviation difference replaces the original instantaneous network time deviation.

11. The method according to claim 1, wherein the difference time is filtered in each case.

12. The method according to claim 11, wherein the difference time is filtered using a filter with an exponential smoothing function.

13. The method according to claim 1, wherein, when the specified synchronization master ceases, another component is specified as a new synchronization master.

14. The method according to claim 1, wherein the components of the real-time network are linearly connected to one another.

15. The method according to claim 1, wherein the components each have two ports.

16. The method according to claim 1, wherein the synchronization packets are transmitted in ISO-OSI layer 2.

17. The method according to claim 1, wherein the real-time network represents a serial real-time network, which components are connected to one another via switches.

18. A real-time network system comprising:
a number of components having ports, wherein the number of components are connected to one another via the ports;
the number of components being configured to send synchronization packets to connected components, wherein one of the number of components is designatable as a synchronization master and a remainder of the number of components are configurable using the synchronization packets to synchronize a local network time for the remainder of the number of components, respectively, with a local network time of the synchronization master;

the number of components being arranged to define a synchronization path so that, starting from the synchronization master, synchronization packets are sent to connected components along the synchronization path to synchronize the local network times of the remainder of the number of components along the synchronization path with the local network time of the synchronization master, wherein the number of components is configured so that, at a time a respective component sends a synchronization packet, a time stamp of the local time of the respective component is transmitted with the synchronization packet, and wherein, when a synchronization packet is received, the components are configured to calculate a difference time for a port from a difference between the time stamp received in the synchronization packet from the connected component and a time stamp of the local time in a receiving component when the synchronization packet is received, and wherein the remainder of the number of components are configured to synchronize respective local network times of the connected components via the difference time.

* * * * *